Figure 1:
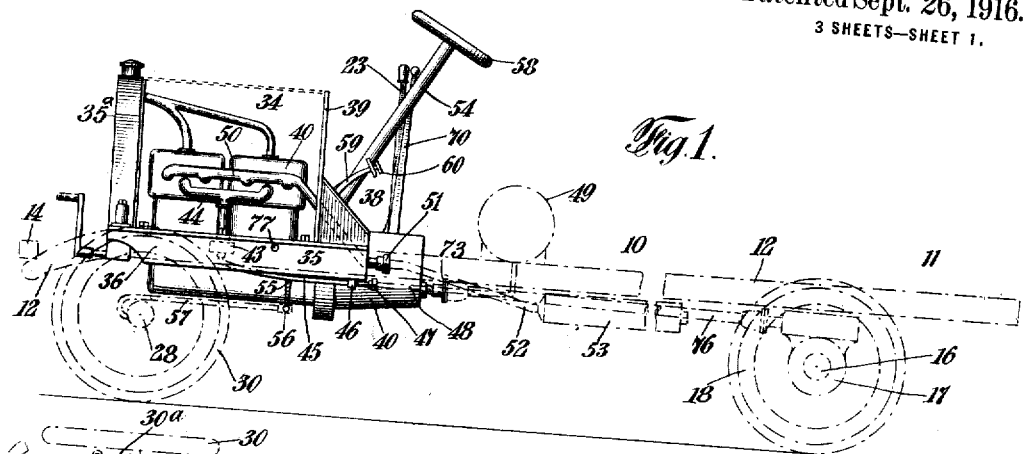

F. MUELLER.
DEMOUNTABLE UNIT POWER PLANT FOR MOTOR VEHICLES.
APPLICATION FILED APR. 12, 1915.

1,199,708.

Patented Sept. 26, 1916.
3 SHEETS—SHEET 1.

WITNESSES:
Anna Ross
Edwin H. Dieterich

INVENTOR
FRANK MUELLER
BY Conrad A. Dieterich
his ATTORNEY.

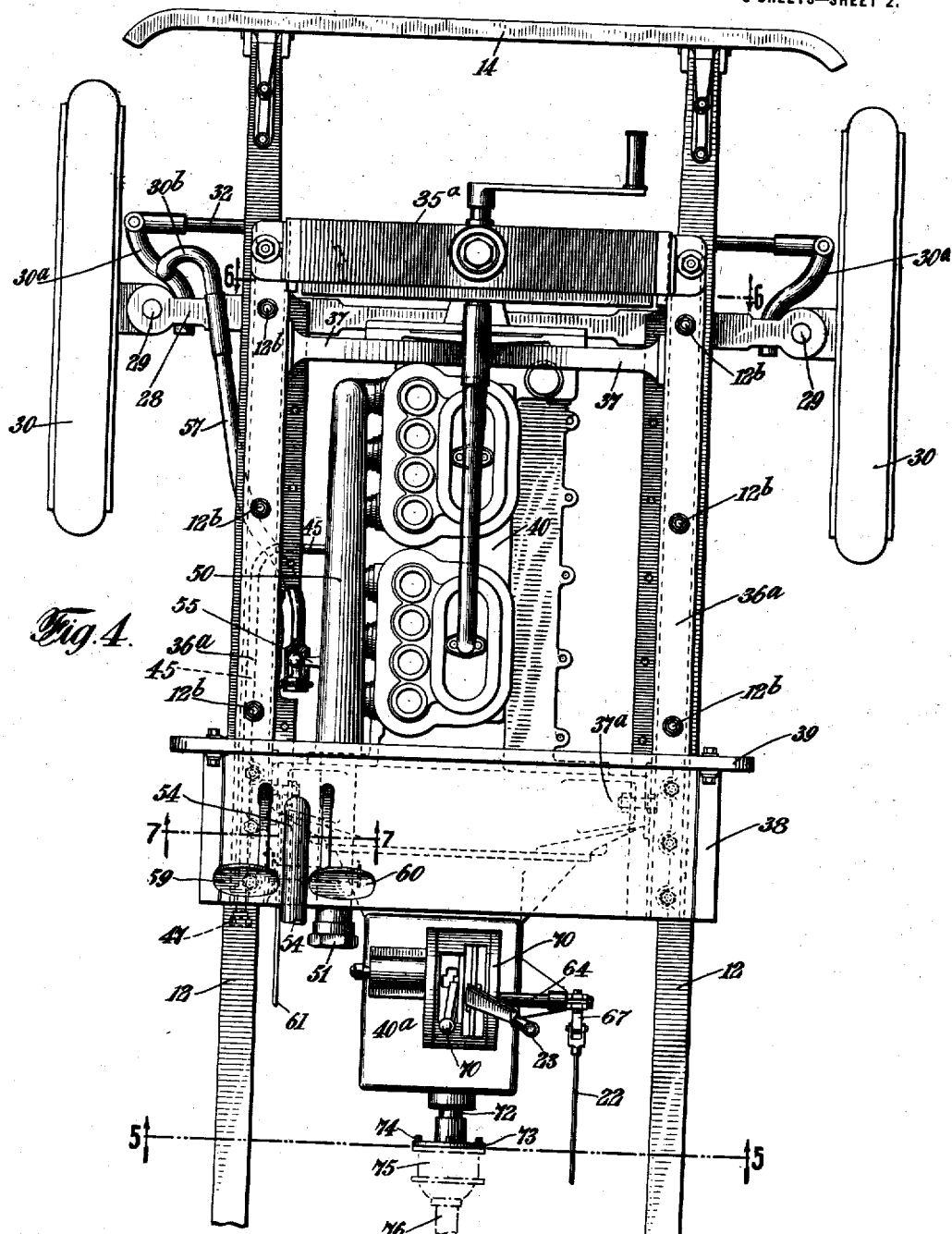

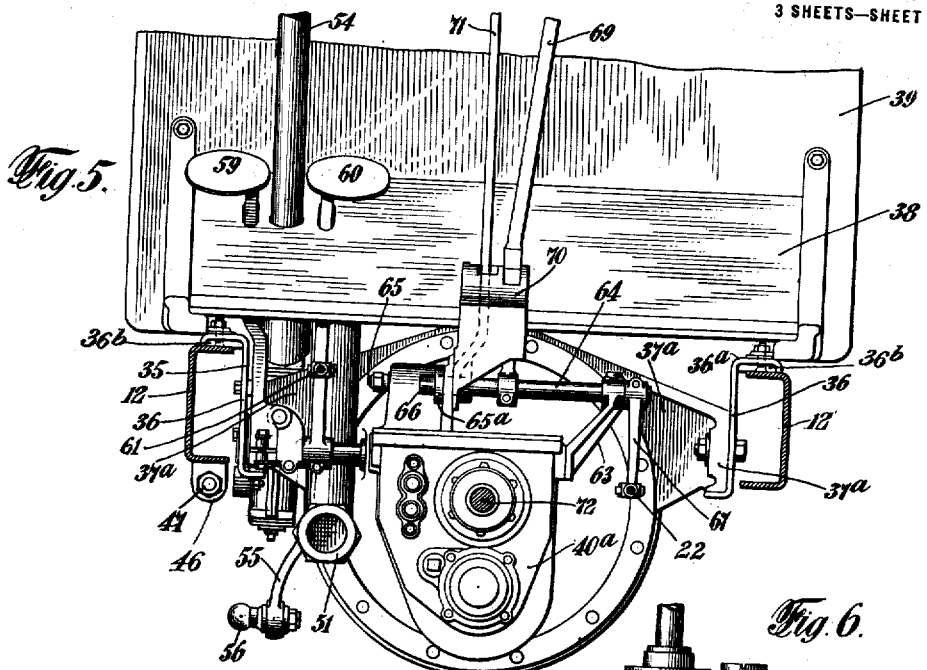
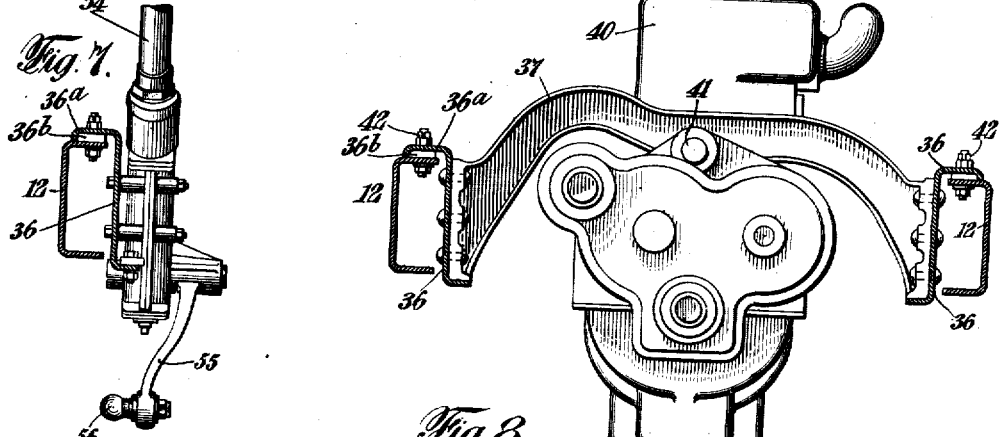
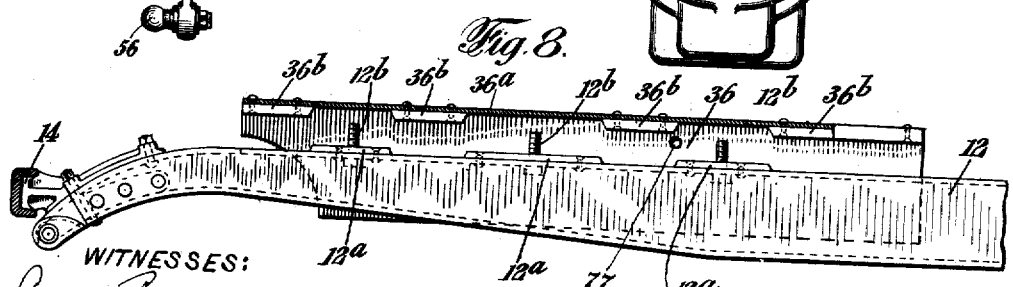

UNITED STATES PATENT OFFICE.

FRANK MUELLER, OF SCRANTON, PENNSYLVANIA, ASSIGNOR TO MACCAR TRUCK COMPANY, OF SCRANTON, PENNSYLVANIA, A CORPORATION OF PENNSYLVANIA.

DEMOUNTABLE UNIT POWER PLANT FOR MOTOR-VEHICLES.

1,199,708.  Specification of Letters Patent.  Patented Sept. 26, 1916.

Application filed April 12, 1915. Serial No. 20,708.

*To all whom it may concern:*

Be it known that I, FRANK MUELLER, a citizen of the United States, residing at Scranton, Lackawanna county, in the State of Pennsylvania, have invented certain new and useful Improvements in Demountable Unit Power Plants for Motor-Vehicles, of which the following is a full, clear, and exact specification.

My invention relates to improvements in motor vehicles, and the same has for its object more particularly to provide an operating or power plant which with its associated or related parts are so constructed and arranged that the same will be contained within a comparatively small compass, and be capable of being easily fitted upon or removed from the vehicle frame as a complete unit.

Further, said invention has for its object to provide an operating or power plant for motor vehicles which is so constructed and arranged that the same may, as a complete unit, be readily removed from one vehicle, and without change or alteration be fitted upon another vehicle of the same general class or type.

Further, said invention has for its object to provide an operating or power plant which with its permanently connected actuating and operating elements or parts may be kept as an extra or reserve unit, ready to be fitted upon another vehicle of the same type or class, to replace one which in part, or as a whole, has become temporarily or permanently unfit for use.

Further, said invention has for its object to provide an operating or power plant together with means for actuating the same, and means for controlling the movement of said vehicle, which plant or means are so constructed and assembled that it merely requires the releasing of a few coupling members, and bolts to permit of said power plant, and the said parts which are permanently secured thereto, being removed bodily as a unit from the vehicle frame.

Further, said invention has for its object to provide an interchangeable operating or power plant which together with its connected parts may be readily taken from one vehicle and fitted to another without change or alteration, and without regard to the size or capacity of the vehicle.

To the attainment of the aforesaid objects and ends, my invention consists in the novel details of construction, and in the combination, connection and arrangement of parts hereinafter more fully described and then pointed out in the claims.

Figure 2:
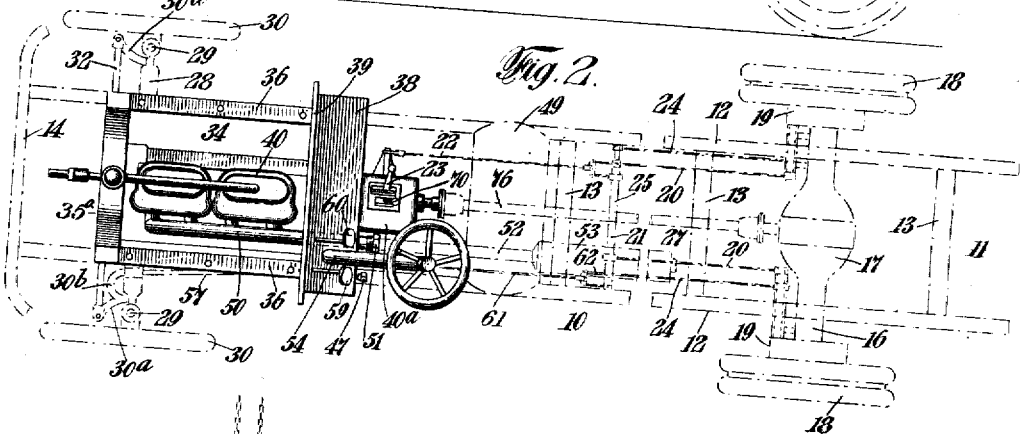
Figure 3:
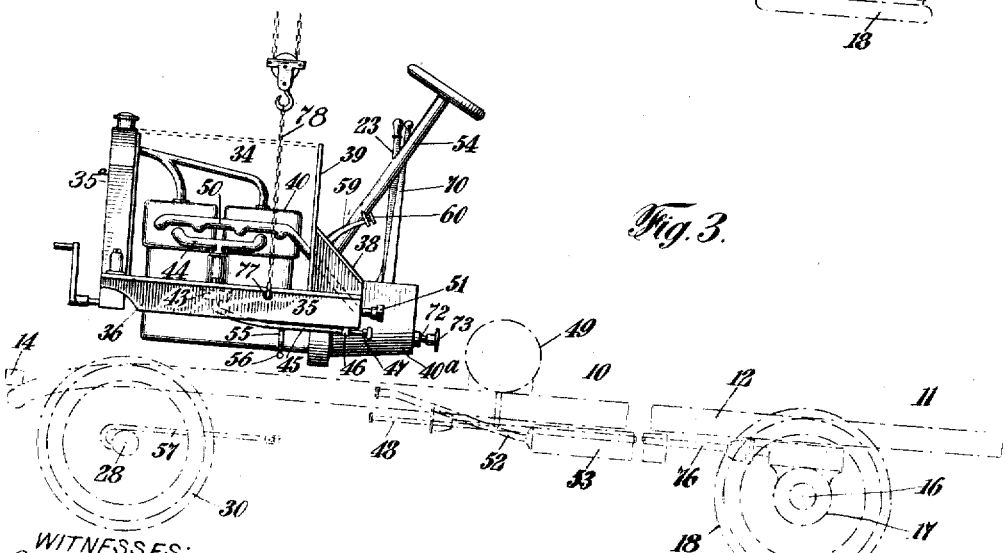

In the accompanying drawings forming part of this specification wherein like numerals of reference indicate like parts,—Figure 1 is a side view of a motor vehicle chassis with one form of demountable operating or power plant constructed according to, and embodying my invention applied thereto; Fig. 2 is a plan or top view thereof; Fig. 3 is a view similar to Fig. 1 showing the operating or power plant disconnected and bodily removed from the chassis; Fig. 4 is an enlarged detail top or plan view showing the forward portion of the chassis with the operating or power unit secured in position thereon; Fig. 5 is a transverse section taken on the line 5—5 of Fig. 4; Fig. 6 is a transverse section taken on the line 6—6 of Fig. 4; Fig. 7 is an enlarged detail section, taken on about the line 7—7 of Fig. 4, showing the construction and mounting of the steering post and its connected parts, and Fig. 8 is an enlarged detail side view partly in section, showing the forward portion of the vehicle frame, and one of the side members of the sub-frame in slightly raised position relative thereto.

In said drawings, 10 designates a motor vehicle which may be of any desired type and size. The same is herein shown, for example, as a motor truck comprising a main frame or chassis 11 composed of longitudinal side frame members 12, 12, formed of channel bars, connected together by transverse frame members 13, 13. The forward ends of the longitudinal frame members 12, 12 are held in properly spaced relation by means of the bumper 14 which is secured to the upper forward ends of said longitudinal side members. This is particularly essential when the operating or power plant has been disconnected as a unit preparatory to removing the same from the frame.

Upon the upper surfaces of each of the longitudinal side frame members 12, 12, adjacent to their forward ends are provided spaced, upwardly-extending projections $12^a$, $12^a$, $12^a$, and bolts $12^b$, $12^b$, $12^b$, which have their lower ends extending through and secured to said projections, and the upper flanges of said side members 12, 12.

At the rear end of the frame 11 are mounted the axle 16, and the usual differential gearing contained in the casing 17, formed as a part of the axle 16.

18, 18 denote the rear or driving wheels which are mounted upon the opposite ends of the axle 16, and provided with brake drums 19, 19. The brake bands or elements, which engage directly the brake drums 19, 19, are connected by links 20, 20 with an equalizing shaft 21 and sleeve 25, supported transversely of the frame 11. The equalizing shaft 21 and sleeve 25, in turn, are connected by a link 22, and related parts 67, 64 with the emergency brake lever 23. A second pair of links 24, 24 extends from said brake bands or elements to said shaft 21 and sleeve 25, and are connected by a link 62 and rod 61 with the foot brake lever 60.

27 denotes the exhaust muffler secured to the underside of the frame near the center thereof.

Adjacent to the forward end of the frame 11 is secured the front axle 28 provided with the usual steering knuckles 29, 29, upon which are mounted front wheels 30, 30. The steering knuckles 29, 29 are provided with arms 30$^a$, 30$^a$ which are connected together by a transverse link 32, and an arm 30$^b$.

34 denotes the complete demountable unit operating or power plant comprising a sub-frame or support 35 formed of a pair of short side frame members 36, 36 composed of Z-iron secured together at their forward ends by an irregularly-arched, transverse member 37, and at their rear ends by two lugs 37$^a$, 37$^a$ extending from the rear end of the crank case and secured directly below the toe-board 38, and dash board 39 to the side frame members of the frame. From the middle of the arched transverse member 37 the forward end of the engine 40 and transmission 40$^a$, and the operating parts for said transmission are pivotally suspended from a stud 41.

The upper horizontal flanges 36$^a$ of the side frame members 36 of the sub-frame 35 extend outwardly, and are provided upon their undersides with projections 36$^b$, 36$^b$ which are adapted to fit into the spaces between the projections 12$^a$, 12$^a$, on the main frame side members 12, 12, whereby to hold said sub-frame 35 against longitudinal movement upon said main frame. Intermediate said projections 36$^b$, 36$^b$, the upper horizontal flanges are provided with apertures to receive the bolts 12$^b$, 12$^b$, fixed upon said main frame side members 12, 12, whereby the sub-frame as a whole is demountably secured in position upon said main frame. At the extreme forward end of the said sub-frame or support 35 is secured a radiator 35$^a$.

43 denotes a carbureter which is connected by a manifold 44 with the intake ports of the engine, and 45 denotes a pipe having one end connected to said carbureter, and its other end extending downwardly below the left hand side member of the sub-frame 35, and rigidly secured thereto by a strap 46. The extreme end of the said pipe 45 46. extends slightly beyond the rear edge of the sub-frame 35, and is provided with a coupling 47 by means of which said pipe may be connected with a pipe 48 leading to the gasolene tank 49.

50 denotes the exhaust manifold which is connected at its upper end with the exhaust ports of the motor, and has its other end extending downwardly below the toe-board 38. The extreme lower end of said exhaust manifold extends slightly beyond the rear edge of said toe-board and said sub-frame 35, and is provided with a coupling 51 whereby the said end of the manifold may be connected with a pipe 52 leading to the muffler 53.

54 denotes the steering post which extends through the toe-board 38, and is secured to the left hand side member of the sub-frame 35, as shown at Fig. 7. The said steering post is provided at its lower end with an arm 55 which is detachably connected by a ball and socket connection 56 with a bent rod 57 having its forward end connected to arm 30$^b$ on the left hand steering knuckle 29. The upper end of the steering post 54 is provided with the usual steering wheel 58, and spark control (not shown).

59 denotes a foot lever which extends through the toe-board 38, and has its lower end pivotally mounted upon the transmission casing 40$^a$, and connected with the means (not shown) for actuating the clutch. 60 denotes a similar lever which also extends through the toe-board 38, and has its lower end pivotally supported upon the rear left hand side of the transmission casing, and 61 denotes a rod which has its forward end forked and detachably connected to said lever 60, and its rear end connected by means of an intervening mechanism 62 to the equalizing shaft 21, sleeve 25, and links 24, 24 with the brake bands or elements which engage directly with the brake drums 19, 19 on the driving wheels. Upon the right hand side of the transmission casing 40$^a$ is secured a bracket 63 supporting one end of a shaft 64 which has its left hand end mounted in a bearing 66 provided upon the transmission casing 40$^a$. To the outer end of said shaft 64 is connected a depending arm 67 having its lower end pivotally connected to the link 22 extending to the equalizing shaft 21 of the emergency brake mechanism. The brake-operating lever 23 extends through the segment 70', supported upon the transmission casing 40ª, and has its lower end secured to the shaft 64 to permit of the actuating of said emergency brake. 70 denotes a speed controlling lever which also extends through the segment 70', and has its lower end connected to the shaft 65 located in front of the shaft 64 and supported in a bearing 65ª mounted upon the gear case 40ª. The lower end of said lever 70 is provided with a depending arm which is connected with the transmission mechanism located within the casing 40ª.

72 denotes the main shaft which extends rearwardly from the transmission mechanism through the casing 40ª, and is provided with a flanged collar 73 adapted to be connected by six bolts, 74, 74, with a correspondingly-shaped flanged collar 75 secured upon the forward end of the shaft 76 extending from the differential gearing contained in the casing 18 on the rear axle.

The operation of the apparatus is as follows:—The operations of the steering mechanism, the emergency brake, the foot brake, the clutch, and the spark and throttle control are the same as in an ordinary motor vehicle. When it is desired to remove the power plant bodily from the vehicle in order to substitute another in place thereof, it merely becomes necessary to disconnect the arm 55 at the lower end of the steering post 54 from the rear end of the link 57, which is connected at its forward end to the steering arm. Next to disconnect the collar 73 from its coöperating collar 75 of the universal joint at the rear end of the main driving shaft by removing the bolts 74, then disconnect the emergency brake my removing the pin which connects the lower end of the arm 67 on the shaft 64 with the forward end of the rod 22; disconnect the foot pedal 60 from the brake operating mechanism by withdrawing the pin which extends through the forward forked end of the link 62 and through said lever 60, and then disconnect the coupling 51 which serves to connect the rear end of the exhaust manifold 50 with the pipe leading to the muffler 53, and disconnect the gasolene pipe 46 by disconnecting the coupling 47 which serves to unite said pipe with the pipe 48 extending from the gasolene supply tank 49. Hereupon the six nuts upon the bolts 12ᵇ, 12ᵇ, are removed and the hooks secured at the lower ends of a chain 78, which is suspended from a suitable hoisting mechanism, are inserted into the openings 77, 77 provided in the side members of the sub-frame 35, at such point as will cause the entire mechanism carried by said sub-frame to be properly balanced. Hereupon it merely becomes necessary to actuate the hoisting mechanism, and to raise the power plant unit bodily out of the main frame as shown at Fig. 3. To insert the new power plant unit, in place of the one removed, the reverse of the foregoing operation is performed.

Having thus described my said invention, what I claim and desire to secure by Letters Patent is:—

1. The combination of a motor vehicle and the frame thereof comprising side members, with a sub-frame having side members comprising Z irons the outwardly extending upper flanges of which are supported upon the upper surfaces of the side members of said frame, a power plant supported by the inwardly extending lower flanges of the Z irons, and means for detachably securing the sub-frame and power plant in place upon the vehicle frame, substantially as specified.

2. The combination of a motor vehicle and the frame thereof with a plurality of projections arranged in spaced relation thereon, a support having a series of projections arranged in spaced relation thereon and adapted to intermesh with the projection upon said vehicle frame, a power plant, and means for controlling the movement of said vehicle mounted upon said support, and means for detachably securing said support and parts carried thereby in place upon said vehicle frame, and means for detachably connecting the several parts of said motor with their respective coöperating parts mounted upon the vehicle frame, substantially as specified.

3. The combination of a motor vehicle and the frame thereof with a series of spaced projections arranged upon the upper surfaces of each of the side members of said frame, a support, a series of projections arranged in spaced relation on the opposite sides of said support and adapted to intermesh with the projections upon the side members of said vehicle frame, a power plant, and means for controlling the movement of said vehicle mounted upon said support, and means for detachably securing said support and parts carried thereby in place upon said vehicle frame, and means for detachably connecting the several parts of said motor with their respective coöperating parts mounted upon the vehicle frame, substantially as specified.

4. The combination of a motor vehicle, the main frame thereof and the wheels, the brake mechanism, differential gearing, the driving shaft extending from said differential gearing, and the muffler on said main frame with a sub-frame, means for supporting said sub-frame in position upon said main frame, means for securing said sub-frame against vertical and longitudinal movement upon said main frame; said sub-frame having mounted thereon in fixed relation thereto an engine, a transmission mechanism, means for operatively connecting said transmission mechanism with said engine, brake operating means, steering mechanism, means for detachably connecting said transmission mechanism with the shaft extending from said differential gearing, means for detachably connecting said brake operating means with the brake mechanism arranged upon the driving wheels, means for detachably connecting the engine with the source of gasolene supply, means for detachably connecting the exhaust ports of the engine with the muffler, and means for detachably connecting the steering mechanism with the forward wheels of the vehicle.

Signed at the city of New York, in the county and State of New York, this 30th day of March, one thousand nine hundred and fifteen.

FRANK MUELLER.

Witnesses:
N. M. GARDNER,
CONRAD A. DIETERICH.

ing said transmission mechanism with said engine, brake operating means, steering mechanism, means for detachably connecting said transmission mechanism with the shaft extending from said differential gearing, means for detachably connecting said brake operating means with the brake mechanism arranged upon the driving wheels, means for detachably connecting the engine with the source of gasolene supply, means for detachably connecting the exhaust ports of the engine with the muffler, and means for detachably connecting the steering mechanism with the forward wheels of the vehicle.

Signed at the city of New York, in the county and State of New York, this 30th day of March, one thousand nine hundred and fifteen.

FRANK MUELLER.

Witnesses:
N. M. GARDNER,
CONRAD A. DIETERICH.

---

It is hereby certified that in Letters Patent No. 1,199,708, granted September 26, 1916, upon the application of Frank Mueller, of Scranton, Pennsylvania, for an improvement in "Demountable Unit Power Plants for Motor-Vehicles," errors appear in the printed specification requiring correction as follows: Page 3, line 39, for the word "my" read *by;* same page, lines 89–90, claim 2, for the word "projection" read *projections;* same page, claim 2, line 90, and claim 3, line 109, after the word "plant" strike out the comma; and that the said Letters Patent should be read with these corrections therein that the same may conform to the record of the case in the Patent Office.

Signed and sealed this 24th day of October, A. D., 1916.

[SEAL.]

F. W. H. CLAY,

*Acting Commissioner of Patents.*

It is hereby certified that in Letters Patent No. 1,199,708, granted September 26, 1916, upon the application of Frank Mueller, of Scranton, Pennsylvania, for an improvement in "Demountable Unit Power Plants for Motor-Vehicles," errors appear in the printed specification requiring correction as follows: Page 3, line 39, for the word "my" read *by;* same page, lines 89–90, claim 2, for the word "projection" read *projections;* same page, claim 2, line 90, and claim 3, line 109, after the word "plant" strike out the comma; and that the said Letters Patent should be read with these corrections therein that the same may conform to the record of the case in the Patent Office.

Signed and sealed this 24th day of October, A. D., 1916.

[SEAL.]                                             F. W. H. CLAY,

*Acting Commissioner of Patents.*